H. C. PRICE.
WATER-CLOSETS.
No. 195,397. Patented Sept. 18, 1877.
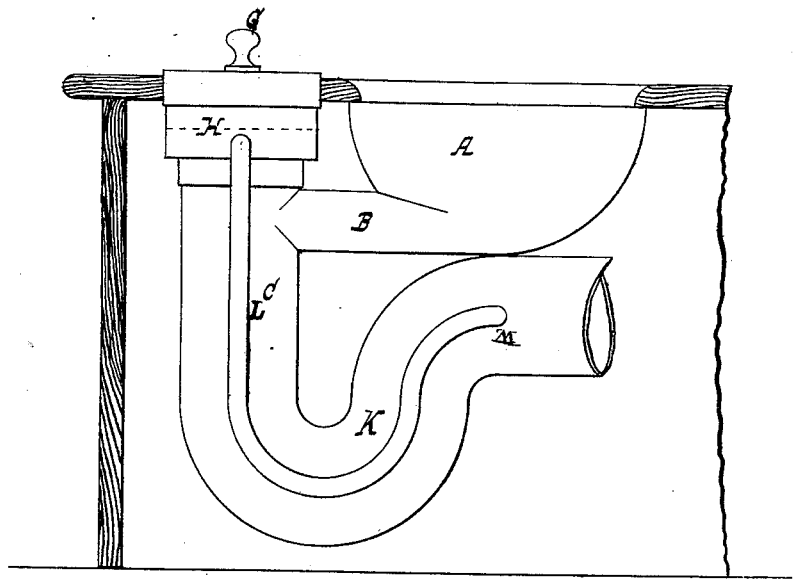
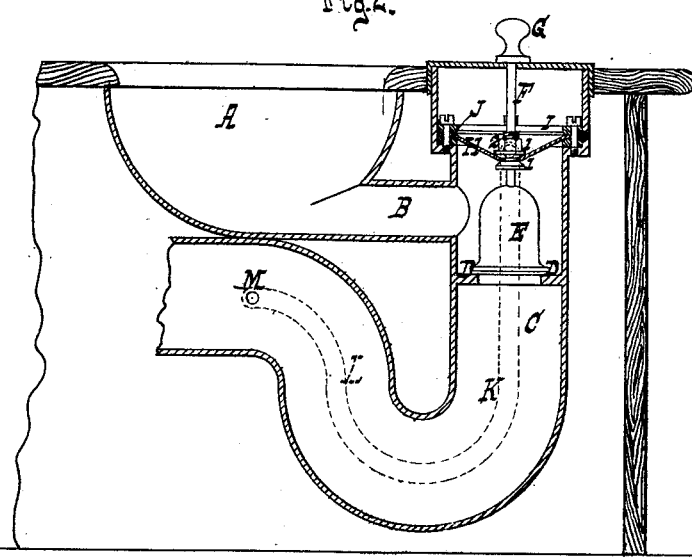
Witnesses.
Otto Hufeland
Robt. E. Miller
Inventor.
Henry C. Price
per
Van Santvoord & Hauff
Attorneys.

UNITED STATES PATENT OFFICE.

HENRY C. PRICE, OF NEW YORK, N. Y.

IMPROVEMENT IN WATER-CLOSETS.

Specification forming part of Letters Patent No. 195,397, dated September 18, 1877; application filed September 7, 1877.

*To all whom it may concern:*

Be it known that I, HENRY C. PRICE, of the city, county, and State of New York, have invented a new and useful Improvement in Water-Closets, which improvement is fully set forth in the following specification, reference being had to the accompanying drawing, in which—

Figure 1 is an elevation of a water-closet containing my improvements. Fig. 2 is a vertical section.

Similar letters indicate corresponding parts.

This invention consists in combining, with the ordinary trap of a water-closet, a supplementary overflow trap-pipe, which emerges from the vertical part of the main trap-pipe, above the level of the discharge-pipe leading from the basin, and extends thence outside of the trap, either along the same or in a more direct course, if preferred, to a point at or near the end or neck of the trap, where it enters the same, so as to discharge into its neck beyond the "dip" of the trap. By this means an overflow-pipe is provided which carries off the overflow water when the main trap is clogged, and discharges it into the neck of the trap beyond its dip, and which is not liable to be stopped up by solid matter coming from the basin, and which, by reason of its trap form, is not liable to conduct toward the basin an upward current of foul air.

My invention consists, further, in a flexible diaphragm arranged across the trap-pipe, above the mouth of the overflow-pipe, and connected to the stem of the valve which closes the main trap, so that the overflow-pipe will not be liable to be "siphoned out" or emptied, and effluvia cannot pass up through the top of the pipe in which the valve-stem works.

The letter A designates the basin of a water-closet, and B the lateral pipe through which the contents of the basin are discharged into the vertical part C of the trap-pipe. The pipe C is provided with a valve-opening and seat, D, which is closed by a valve, E, whose stem F extends up through the top of the pipe, and is provided with a handle, G, which is to be placed, as usual, within reach of the person using the apparatus. The upper part of the vertical pipe C is closed by an air-tight flexible diaphragm, H, which is confined, at its circumference, to the interior of the pipe by a ring, I, which holds the edge of the diaphragm upon a shoulder, J. The valve-stem passes through the central part of the diaphragm, and is secured to it by means of washers 1 1 and a ring-nut, 2, which screws upon a thread formed on that part of the stem where the diaphragm is to be attached to it, the upper washer being pressed against a shoulder formed around the stem.

The letter K designates the main trap, which forms a continuation of the pipe C. L is a supplementary or overflow trap-pipe, which leaves the vertical pipe C below the diaphragm, and is carried, in this example, downward along the outside of the trap, past its dip, and is turned into the neck of the pipe at M.

The point in the vertical pipe C, where the supplementary trap-pipe leaves it, is above the lateral discharge-pipe B, and preferably about on the same horizontal line with the line at which it is intended the water shall stand in the basin when the apparatus has been made ready for use.

The supplementary or overflow trap-pipe carries off the water which rises in pipe C when the trap K becomes clogged, and delivers it beyond the dip of the trap into the neck of the trap, thereby preventing injury to the apparatus and the occurrence of a nuisance from the overflow of water or rubbish arising from the clogging of the main trap.

By starting the supplementary trap above the level of the basin-discharge pipe B, I preserve it from the liability of receiving any solid matter; and by giving it the form of a trap I prevent the backward flow of foul air through it.

The diaphragm H is made flexible, so as to allow the valve-stem to be attached to it, and allow the valve of pipe C to be opened without permitting the escape of foul air from the main trap through the top of the pipe.

What I claim as new, and desire to secure by Letters Patent, is—

1. The supplementary or overflow trap-pipe L, arranged, substantially as described, in combination with the main trap K of a water-closet, substantially as set forth.

2. The flexible diaphragm H, attached to the stem of the valve E, in combination with the traps K and L, or either of them, substantially as described.

In testimony that I claim the foregoing I have hereunto set my hand and seal this 15th day of March, 1876.

HENRY C. PRICE. [L. S.]

Witnesses:
W. HAUFF,
E. F. KASTENHUBER.